(12) United States Patent
Fuhrman et al.

(10) Patent No.: US 8,437,909 B2
(45) Date of Patent: May 7, 2013

(54) METHOD AND APPARATUS FOR COMMUNICATION WITHIN CONTROL SYSTEMS

(75) Inventors: Thomas E. Fuhrman, Shelby Township, MI (US); Miroslawa A. Supal, Grosse Pointe Woods, MI (US); Arnold W. Millsap, Leonard, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 13/035,375

(22) Filed: Feb. 25, 2011

(65) Prior Publication Data

US 2011/0144862 A1 Jun. 16, 2011

Related U.S. Application Data

(62) Division of application No. 12/917,908, filed on Nov. 2, 2010, which is a division of application No. 12/619,018, filed on Nov. 16, 2009, now Pat. No. 7,853,377, which is a division of application No. 11/028,886, filed on Jan. 4, 2005, now Pat. No. 7,693,628.

(51) Int. Cl.
*G06F 7/00* (2006.01)

(52) U.S. Cl.
USPC ........ 701/36; 701/1; 701/24; 701/40; 701/42; 318/580; 318/587; 340/459; 340/463; 340/466; 340/470

(58) Field of Classification Search .................. None
See application file for complete search history.

(56) References Cited

U.S. PATENT DOCUMENTS

| 3,078,344 | A | | 2/1963 | Crafts et al. |
| 4,384,324 | A | | 5/1983 | Kim et al. |
| 4,414,661 | A | * | 11/1983 | Karlstrom ..................... 370/332 |
| 4,663,748 | A | | 5/1987 | Karbowiak et al. |
| 4,754,402 | A | | 6/1988 | Wand |
| 5,280,129 | A | | 1/1994 | Yamamori et al. |
| 5,916,288 | A | | 6/1999 | Hartman |
| 5,995,884 | A | * | 11/1999 | Allen et al. ..................... 701/24 |
| 6,182,005 | B1 | | 1/2001 | Pilley et al. |
| 6,213,567 | B1 | * | 4/2001 | Zittlau et al. .................... 303/20 |
| 6,252,544 | B1 | | 6/2001 | Hoffberg |
| 6,378,959 | B2 | | 4/2002 | Lesesky et al. |
| 6,418,200 | B1 | | 7/2002 | Ciccolella et al. |
| 6,453,071 | B2 | * | 9/2002 | Ito et al. ......................... 382/232 |
| 6,470,242 | B1 | * | 10/2002 | Rudow et al. ..................... 701/1 |
| 6,681,115 | B1 | * | 1/2004 | McKenna et al. ............. 455/517 |

(Continued)

*Primary Examiner* — Khoi Tran
*Assistant Examiner* — Jonathan L Sample
(74) *Attorney, Agent, or Firm* — Cantor Colburn LLP

(57) ABSTRACT

A computer program product includes a storage medium that stores instructions for execution by a processing circuit for practicing a method for synchronous communication in a control system. Within a first time interval, a first source task is executed to broadcast a first destination task, within a second sequential time interval, the first destination task is communicated over a channel to a first destination, and within a third sequential time interval, the first destination task is consumed. Within the first time interval, a second source task may be executed to broadcast a second destination task, within the second sequential time interval, the second destination task may be communicated over the channel to a second destination, and within the third sequential time interval, the second destination task may be consumed. The first source task is allowed to be scheduled ahead of the second source task, and the second source task is allowed to be scheduled ahead of the first source task.

7 Claims, 4 Drawing Sheets

U.S. PATENT DOCUMENTS

| | | | |
|---|---|---|---|
| 6,882,912 B2 * | 4/2005 | DiLodovico et al. | 701/32.2 |
| 7,059,689 B2 | 6/2006 | Lesesky et al. | |
| 7,099,745 B2 * | 8/2006 | Ebert | 700/245 |
| 2001/0001319 A1 * | 5/2001 | Beckert et al. | 701/36 |
| 2002/0089956 A1 * | 7/2002 | Haugli et al. | 370/335 |
| 2002/0163905 A1 * | 11/2002 | Brabrand | 370/347 |
| 2002/0198632 A1 | 12/2002 | Breed et al. | |
| 2003/0043186 A1 * | 3/2003 | Libman | 345/748 |
| 2003/0093187 A1 | 5/2003 | Walker | |
| 2003/0128111 A1 * | 7/2003 | Sano et al. | 340/459 |

* cited by examiner

METHOD AND APPARATUS FOR COMMUNICATION WITHIN CONTROL SYSTEMS

CROSS REFERENCE TO RELATED APPLICATIONS

This application is a divisional application of U.S. application Ser. No. 12/917,908, filed Nov. 2, 2010, now pending, which is a divisional application of U.S. application Ser. No. 12/619,018, filed Nov. 16, 2009, now U.S. Pat. No. 7,853, 377, which is a divisional application of U.S. application Ser. No. 11/028,886, filed Jan. 4, 2005, now U.S. Pat. No. 7,693, 628, which are all hereby incorporated by reference in their entireties.

BACKGROUND OF THE INVENTION

The present disclosure relates generally to a method and apparatus for communication within control systems, and particularly to a method and apparatus for communication within drive-by-wire systems for use in automobiles.

The term drive-by-wire originally referred to methods of automatic steering of a vehicle using circuits embedded in a road surface. Today, the term refers to the removal of mechanical linkages between driver interfaces of a vehicle and the vehicle subsystems that actually perform the work, and the introduction of sensors, a central controller, peripheral control systems, and signal communication, to perform the desired vehicle maneuver. Instead of operating the steering, brakes and throttle directly, via drive gears, linkages, or hydraulic pistons for example, a drive-by-wire system would control the response of the vehicle via sensors, a central or distributed controller, and commands communicated to peripheral control systems, such as stepper motors for example, over a communication bus.

By integrating the steering, braking, and propulsion control subsystems of a vehicle into a drive-by-wire system, synergistic vehicle performance is anticipated, resulting in improved vehicle handling, especially in bad road conditions, better fuel economy, reduced emissions, and improved reaction times in emergency situations. With drive-by-wire systems, it is also contemplated that reduced cost and complexity of manufacture may be achievable.

While present control-by-wire systems used in automobiles may be suitable for their intended purposes, there is a need in the art for signal communication schemes between a source node and a destination node, or between a source node and multiple destination nodes, via an associated communication controller, that would be more advantageous for the scheduling of operating system tasks in a high volume automotive production cycle environment.

BRIEF DESCRIPTION OF THE INVENTION

Embodiments of the invention include a method for synchronous communication in a control system. Within a first time interval, a first source task is executed to broadcast a first destination task, within a second sequential time interval, the first destination task is communicated over a channel to a first destination, and within a third sequential time interval, the first destination task is consumed. Within the first time interval, a second source task may be executed to broadcast a second destination task, within the second sequential time interval, the second destination task may be communicated over the channel to a second destination, and within the third sequential time interval, the second destination task may be consumed. The first source task is allowed to be scheduled ahead of the second source task, and the second source task is allowed to be scheduled ahead of the first source task.

Further embodiments of the invention include a controller responsive to a clock synchronization mechanism defining synchronous communication cycles, with each communication cycle defining at least one time interval. The controller having a storage medium and a processing circuit. The storage medium, being readable by the processing circuit, stores instructions for execution by the processing circuit for practicing embodiments of the aforementioned method.

Additional embodiments of the invention include a drive-by-communication-signal vehicle including a driver interface subsystem having a sensor responsive to an operational characteristic of the driver interface subsystem, a controller responsive to the sensor, a vehicle subsystem responsive to the controller, and a communication channel in signal communication with the driver interface subsystem, the controller, and the vehicle subsystem. The controller includes a storage medium, a processing circuit, and a clock synchronization mechanism defining synchronous communication cycles, with each communication cycle defining at least one time interval. The storage medium, being readable by the processing circuit, stores instructions for execution by the processing circuit for practicing embodiments of the aforementioned method.

Yet further embodiments of the invention include a computer program product for synchronous communication in a control system. The product includes a storage medium, readable by a processing circuit, that stores instructions for execution by the processing circuit for practicing embodiments of the aforementioned method.

Yet additional embodiments of the invention include a distributed control by wire system having a first processing circuit and a second processing circuit, where each of the first and second processing circuits are adapted for separately executing instructions for practicing embodiments of the aforementioned method.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide a vehicle, such as an automobile for example, operable via a control-by-wire system, or more generally a control-by-communication-signal system, with a controller, whether it be a central or a distributed controller, that operates under a synchronous communication scheme such that a source task is executed in a first time interval, such as a communication cycle or segment thereof, the outputs of the source task are communicated, either directly or in a broadcast manner, to a destination task in a second sequential time interval, and the results are consumed by the destination task in a third sequential time interval. By scheduling the communication-task pair to be operative in sequential time intervals, a three-stage pipeline may be employed to produce a functional output at each clock cycle after initialization. Data dependencies from one node, across a communication channel, such as a bus topology, a star topology, a fiber optic network, or a wireless network, for example, to another node, are prohibited within a single time interval, thereby enabling both task scheduling and communication scheduling to be order-independent within a given time interval.

While embodiments described herein depict an automobile as an exemplary implementation of the invention, it will be appreciated that the disclosed invention is also applicable to other vehicles, such as trucks, buses and military vehicles, for example, and to other control systems employing cyclical communication between two or more nodes, such as in electrical appliances for example. While embodiments described herein depict a control-by-wire system, it will be appreciated that the disclosed invention is also applicable to other communication systems, which may be more generally referred to as control-by-communication-signal systems.

Figure 1:
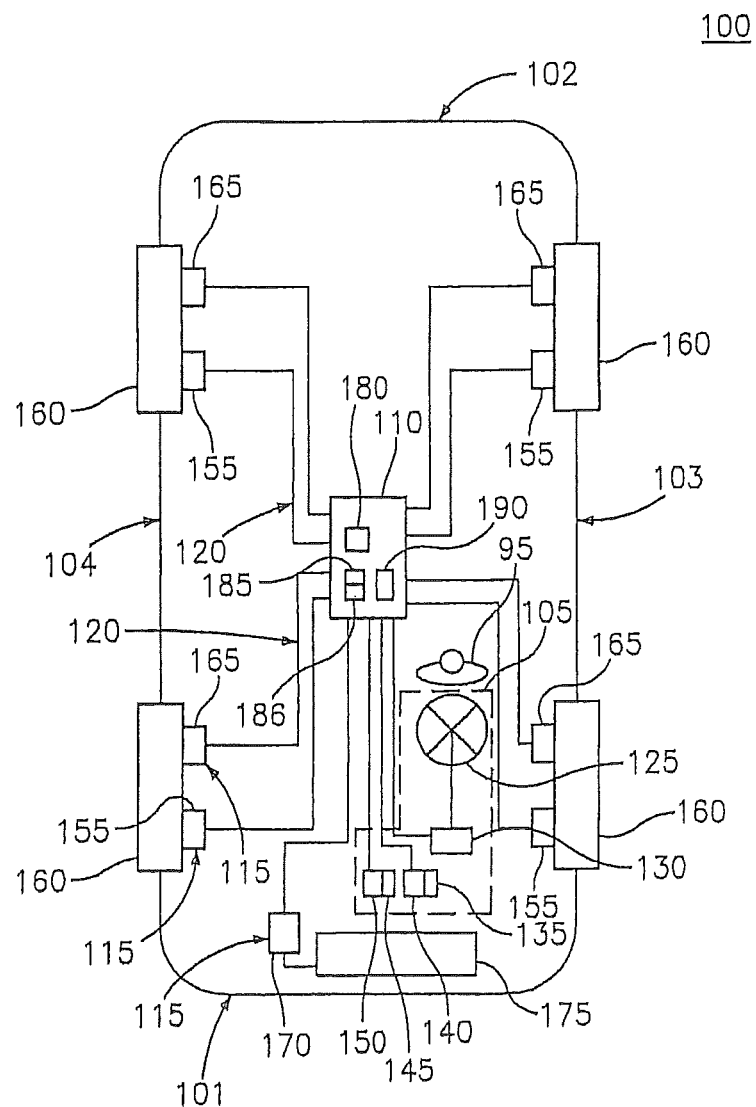
FIG. 1 depicts an exemplary vehicle for implementing embodiments of the invention.

FIG. 1 is an exemplary embodiment of a vehicle 100 having a driver interface subsystem 105, a controller 110, a vehicle subsystem 115, and a communication channel 120. An exemplary vehicle 100 has a front 101, a rear 102, a left side 103, and a right side 104. While controller 110 is depicted in FIG. 1 as a centralized controller, this is for illustrative purposes only, and the scope of the invention is also intended to include separate communication controllers 110 that are associated with a respective sending node of the driver interface subsystem 105.

In an exemplary embodiment, driver interface subsystem 105 includes a steering system interface 125 having a steering sensor 130, a braking system interface 135 having a braking sensor 140, and a propulsion system interface 145 having a propulsion sensor 150. In an embodiment, steering system interface 125 is a steering wheel, braking system interface 135 is a brake pedal, and propulsion system interface 145 is an accelerator pedal, all of which may be operated by a driver 95. However, steering system interface 125, braking system interface 135, and propulsion system interface 145 may be integrated into a single driver control interface, such as a joystick (not shown, but generally referred to as driver interface subsystem 105), for example. With the use of a joystick, vehicle acceleration may be accomplished by moving the joystick forward, vehicle braking by moving the joystick backward, and vehicle steering by moving the joystick left and right. Sensors 130, 140 and 150 sense the position of the respective driver interface subsystems 105, and communicate a signal to controller 110 in response thereto.

In an exemplary embodiment, vehicle subsystem 115 includes a steering control system 155 for controlling the steering of wheels 160 (front, rear or both), a braking control system 165 for controlling the braking of wheels 160, and a propulsion control system 170 for controlling the propulsion provided by power plant 175. In an embodiment, steering control system 155 is a stepper motor, braking control system 165 is a solenoid driven hydraulic piston, propulsion control system 170 is an electronic control module, and power plant 175 is a fuel cell system. However, embodiments of the invention are not limited to only those vehicle subsystems depicted or discussed, and may be employed with any other vehicle subsystems suitable for their intended purpose, such as a combustion engine used in place of a fuel cell for power plant 175 for example.

An exemplary controller 110 includes a storage medium 180, a first processing circuit 185, a second processing circuit 186, and a clock synchronization mechanism 190 that defines synchronous communication cycles. In an embodiment the clock synchronization mechanism 190 may be a system clock. However, there may or may not be a single system clock that all nodes use. As a general matter, the clock synchronization mechanism 190 may be a sophisticated mechanism used to create distributed clock synchronization across all nodes, thereby avoiding a system failure in the event of a faulty single system clock. First and second processing circuits 185, 186 are adapted to communicate over a common communication channel 120, thereby providing a distributed communication scheme that may be globally synchronous and locally asynchronous. In order to provide a global time base, communication over the channel 120 is structured into repeated time intervals (cycles) and portions of a cycle (slots), which will be discussed in more detail below. However, it should be noted at this time that each processing circuit 185, 186 is allocated certain slots, which grants the processing circuits 185, 186 exclusive ownership of the shared communication resource (channel 120). While only two processing circuits 185, 186 are depicted at controller 110, it will be appreciated that this is for illustration purposes only and that embodiments of the invention may include a multitude of processing circuits that operate in a manner disclosed herein. It will also be appreciated that the multitude of processing circuits may be distributed over multiple controllers.

In general, sensors 130, 140, 150 are responsive to the respective driver interface subsystem 105 for providing a signal representative of an operational characteristic of the driver interface subsystem 105 to controller 110, controller 110 is responsive to the sensor input for performing signal processing and providing a control signal to the respective vehicle subsystem 115, and vehicle subsystem 115, being responsive to controller 110, consumes and carries out the desired function of the control signal. Signals from driver interface subsystem 105 to controller 110, and from controller 110 to vehicle subsystem 115, are communicated via communication channel 120.

Figure 2:
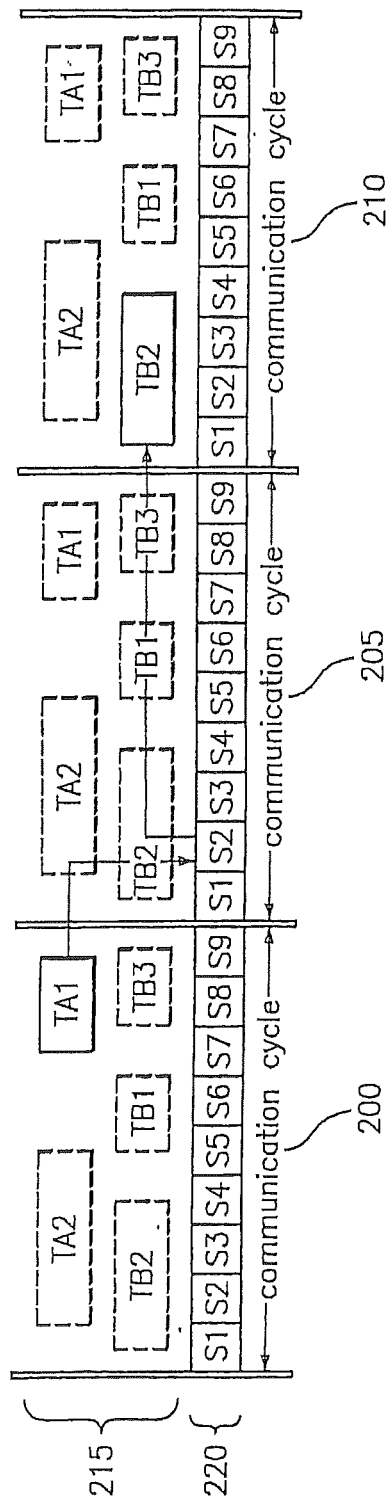
FIGS. 2 and 3 illustrate exemplary task and communication schedules in accordance with embodiments of the invention.
Figure 3:
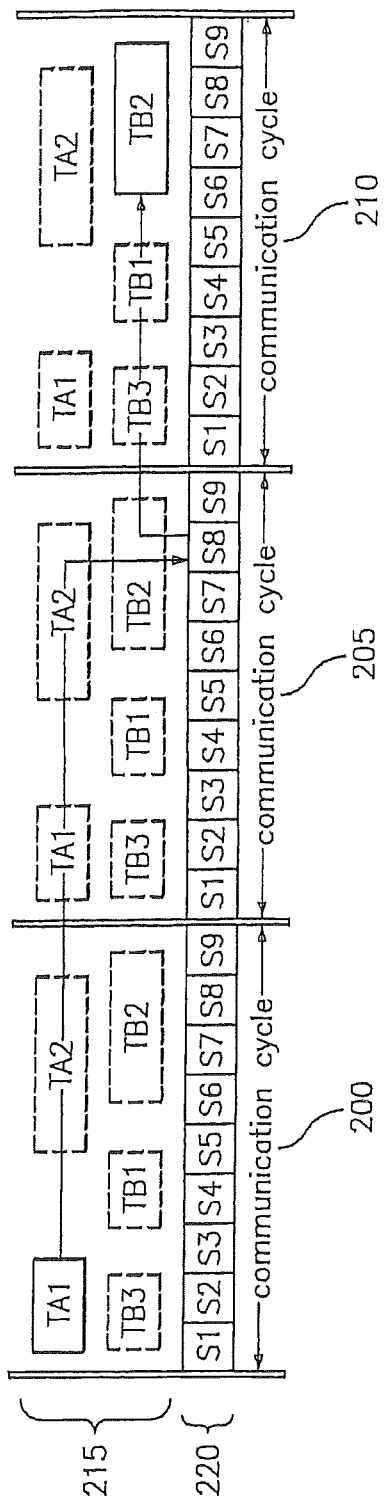

Storage medium 180 is readable by processing circuits 185, 186 and stores instructions for execution by processing circuits 185, 186 for carrying out embodiments of the invention, which will now be discussed with reference to FIGS. 2 and 3. In general, FIGS. 2 and 3 depict three sequential communication cycles 200, 205 and 210, herein referred to as a first communication cycle 200, a second sequential communication cycle 205, and a third sequential communication cycle 210, which are illustrated as being separated by solid vertical black lines. Program tasks 215 are labeled TA1, TA2, TB1, TB2 and TB3, for example. The "T" descriptor identifies the block as a program task, the "A" and "B" descriptors identify whether the task is associated with a source node "A" or a destination node "B", and the "1", "2" and "3" descriptors identify a unique task at the respective node.

With reference to FIG. 1, a source node "A" may be viewed as one of the driver interface subsystems 105, and a destination node "B" may be viewed as one of the vehicle subsystems 115. Channel slots 220 at controller 110 are designated "S1" through "S9", which represent portions of time available for communication on channel 120 that may be exclusively dedicated to a processing circuit 185, 186 of controller 110. Alternatively, in an embodiment having a multitude of controllers, certain slots may be exclusively allocated to certain controllers. The numbers of time slots 220 are not limited to only nine (S1-S9), and may be any number of slots that may reasonably fit with a communication cycle 200, 205, 210 and be suitable for implementing embodiments of the invention.

Referring now to FIG. 2, a first source task TA1 is executed at processing circuit 185 within first communication cycle

200. The results of source task TA1 broadcast a unique destination task TB2, which is communicated via slot S2 of communication channel 120 during second communication cycle 205. During third communication cycle 210, the delivery of destination task TB2 is completed, that is, the results of source task TA1 are consumed by destination task TB2 at the respective destination node. As can be seen, data dependencies from one node "A", across the channel 120, to another node "B", within a single communication cycle 200, 205, 210, are prohibited, thereby enabling both task scheduling and communication scheduling to be order-independent within a communication cycle, which is best seen by comparing FIGS. 2 and 3.

Referring now to FIG. 3, source task TA1, depicted scheduled ahead of TA2, which is opposite to that of FIG. 2, is executed at processing circuit 185 within first communication cycle 200. The results of source task TA1 broadcast the unique destination task TB2, which is communicated via slot S8 of communication channel 120 during second communication cycle 205. During third communication cycle 210, the delivery of destination task TB2 is completed, that is, the results of source task TA1 are consumed by destination task TB2 at the respective destination node. Even though FIG. 3 illustrates a different scheduling order of source tasks TA1 and TA2, and a different usage of communication slots S2 and S8, the end result of the two schedules depicted by FIGS. 2 and 3 will result in identical system behavior.

In view of the foregoing, and by referring to FIGS. 2 and 3 together, it can be seen that embodiments of the invention will allow: the execution of a second source task TA2 that broadcasts a second destination task TB3 to be executed within the first communication cycle 200; the communication of the second destination task TB3 over channel 120 to a second destination within the second communication cycle 205; and, the consumption of second destination task TB3 within the third communication cycle 210, where the first source task TA1 may be scheduled ahead of the second source task TA2 (FIG. 3), and the second source task TA2 may be scheduled ahead of the first source task TA1 (FIG. 2).

Also, the results of source task TA1 may be communicated over slot S2 (FIG. 2) or slot S8 (FIG. 3). Thus, in the scenario of FIG. 2, the results of source task TA2 may be communicated over slot S8, and in the scenario of FIG. 3, the results of source task TA2 may be communication over slot S2. Accordingly, by employing embodiments of the invention, a first channel slot (S2 for example) may be scheduled ahead of a second channel slot (S8 for example), or vice versa, that is, S8 may be scheduled ahead of S2.

Furthermore, the completed delivery of a first destination task TB2, that is, the consumption of the results of first source task TA1 at the respective destination node, may be scheduled ahead of the completed delivery of a second destination task TB3, that is, the consumption of the results of the associated source task. Here, FIG. 2 illustrates first destination task TB2 being scheduled ahead of second destination task TB3, and FIG. 3 illustrates second destination task TB3 being scheduled ahead of first destination task TB2.

As discussed previously, the two schedules depicted by FIGS. 2 and 3 will result in identical system behavior, thereby resulting in a synchronous time-triggered control-by-wire communication scheme where the task scheduling, and the channel slots themselves, is order independent.

In an exemplary embodiment, the first source task TA1 broadcasts a vehicle subsystem control signal that is responsive to the operational characteristics sensed by sensors 130, 140, 150 at the respective driver interface subsystem 105, and the first destination task TB2 defines a control function for implementation at the respective vehicle subsystem 115. For example, source task TA1 may include; receiving the raw signal from steering system sensor 130, which is representative of a turned steering wheel, signal conditioning of the incoming signal, and signal processing to calculate a steering angle, and destination task TB2 may include; receiving the steering angle signal, signal conditioning the incoming signal, and signal processing to establish a stepper motor voltage level and duration. In this manner, controller 110 may be viewed as being operably responsive, in accordance with first source task TA1, to the operational characteristics received from driver interface subsystem 105, and vehicle subsystem 115 may be viewed as being operably responsive, in accordance with first destination task TB2, to the control signals received from controller 110.

Figure 4:
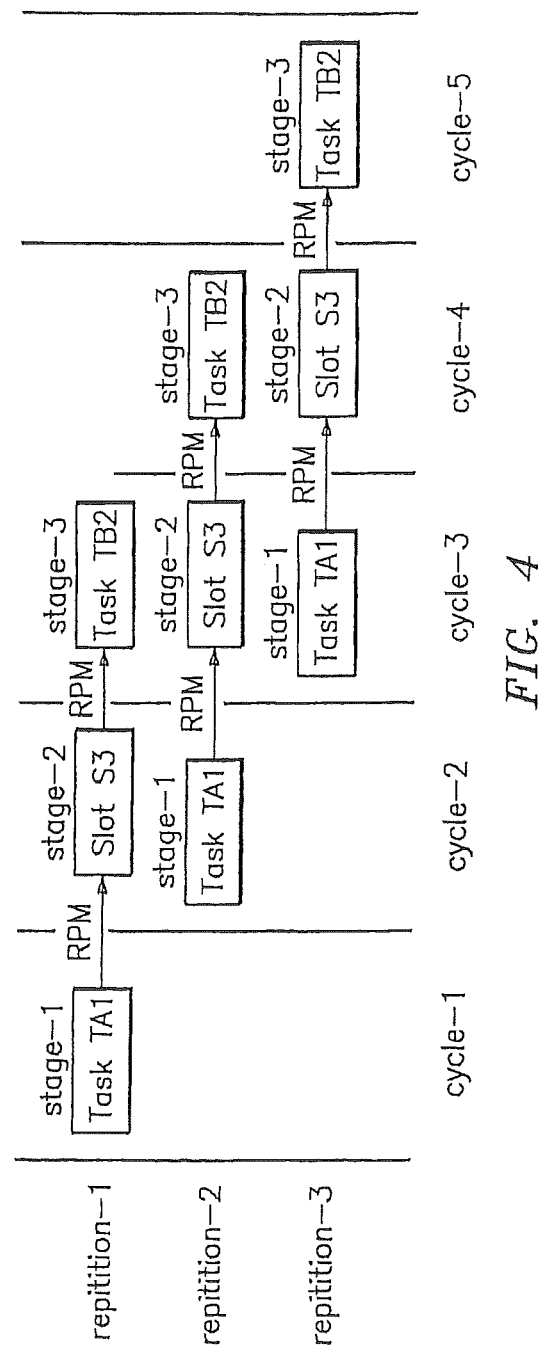
FIG. 4 illustrates an exemplary three-stage pipeline for use in accordance with embodiments of the invention.

As discussed previously, by scheduling the execution of a given source task, such as TA1 for example, to be operative in each communication cycle, a three-stage pipeline may be employed, which is best seen by now referring to FIG. 4. Here, each of the three repetitions 1-3 represents a three-cycle communication scheme as previously discussed, that is, execution in the cycle-1, communication in cycle-2, and consumption in cycle-3. As cycle-1 is completed and the process enters cycle-2 (stage-2), processing circuit 185, for example, can now perform another execution of source task TA1 in response to node "A", while the results of the previous execution (stage-1) are being communicated over slot S3. And, as cycle-2 is completed and the process enter cycle-3 (stage-3), processing circuit 185 can perform yet another execution of source task TA1 in response to node "A", while the results of the first execution (stage-1) are being consumed by destination task TB2, and while the results of the second execution (stage-2) are being communicated over slot S3. In this manner, communication speed may be enhanced without processor wait time. As used herein, the terms "stage-1", "stage-2", and "stage-3", refer to a first, second, and third phase, respectively, of a sequential execution of a single repetition of an algorithm in a pipeline design, where each repetition of the algorithm is staggered in its start time by one cycle relative to the previous repetition.

While some of the aforementioned embodiments may ensure task ordering by implementing a policy where computation tasks always operate on sent data from the previous cycle, thereby avoiding a double-buffering arrangement, other embodiments that do not implement such a policy may have communication tasks occurring in the same cycle as a computation task, thereby requiring a double-buffering arrangement or other communication scheme to ensure a deterministic schedule.

Figure 5:
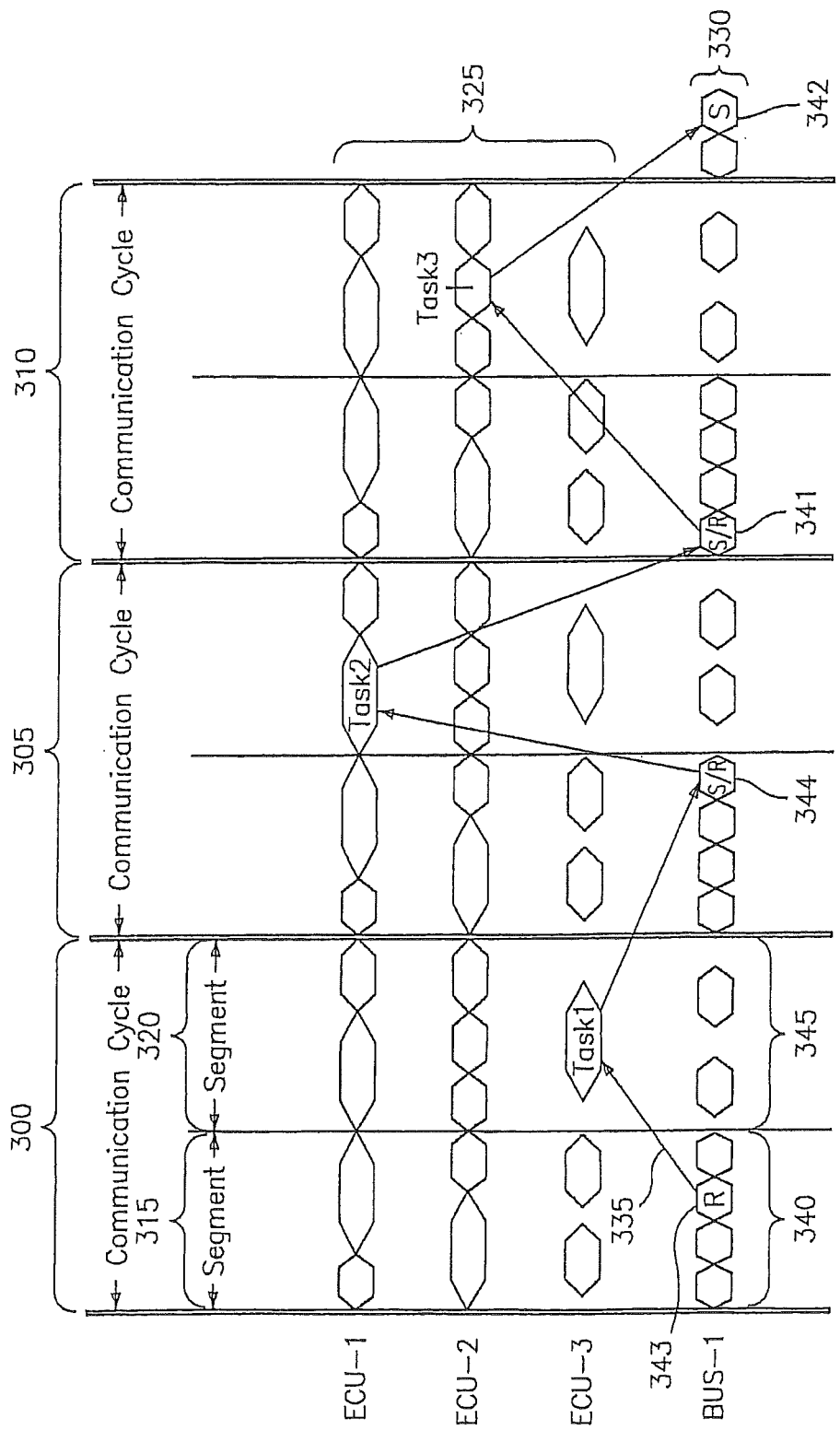
FIG. 5 illustrates an alternative task and communication schedule to that depicted in FIGS. 2 and 3.

By referring now to FIG. 5, an alternative communication scheme to that of FIGS. 2 and 3 will now be described that maintains task ordering while avoiding the need for a double-buffering arrangement. In FIG. 5, the three representative communication cycles 300, 305, 310, which are comparable to communication cycles 200, 205, 210 of FIGS. 2 and 3, are each segmented into two time segments 315, 320. While only two segments 315, 320 are depicted in FIG. 5, it will be appreciated that any number of segments may be used that may reasonably fit with a communication cycle 300, 305, 310 and be suitable for implementing embodiments of the invention.

It should be noted at this time that where FIGS. 2 and 3 depict synchronous communication cycles 200, 205, 210 as discrete time intervals, FIG. 5 depicts synchronous communication segments 315, 320 as discrete time intervals. Thus, and as used herein, a discrete time interval may be viewed as a complete communication cycle or a segment of a communication cycle, depending on the context in which the time interval is being applied.

In the embodiment of FIG. 5, three processing circuits ECU-1, ECU-2 and ECU-3, which compare with aforementioned processing circuits 185, 186, for example, have defined computation tasks 325, and communication channel BUS-1, which compares with aforementioned channel 120, for example, has defined slots 330. As depicted, a functional communication thread 335, which may be a steering control command for example, includes a communication task occurring in the first segment 315 of each cycle 300, 305, 310, and a computation task occurring in the second segment 320 of each cycle 300, 305, 310. By separating the communication task into the first half segment 315, and the computation task into the second half segment 320, task ordering can be maintained without the need for double-buffering.

As depicted, slots 330 associated with BUS-1 includes four slots 340 in the first segment 315 of each cycle 300, 305, 310, and two slots 345 in the second segment 320 of each cycle 300, 305, 310, where "S" refers to a sending unit and "R" refers to a receiving unit of the associated communication signal. In general, each slot of BUS-1 is dedicated to an associated sending unit (the sending ECU for example) of the control system (controller 110 for example). Specifically for the embodiment of FIG. 5, the third slot 343 of each first segment 315 is dedicated to ECU-2 (which is the sending unit not specifically shown in FIG. 5), the fourth slot 344 of each first segment 315 is dedicated to ECU-3, the first slot 341 of each first segment 315 is dedicated to ECU-1, and the second slot 342 of each first segment 315 is dedicated to ECU-2. By providing a processing circuit (ECU-1, ECU-2 and ECU-3, for example) with exclusive control of a communication slot, schedule ordering of a computation task within a segment becomes non-critical, as long as the tasks are allocated sequentially to different segments. However, a stipulation for proper task scheduling is that the task executes completely within its assigned segment.

In the exemplary embodiment of FIG. 5, the computation tasks 325 associated with ECU-1, ECU-2 and ECU-3 are different for the two half segments 315, 320. For example, ECU-1 includes two tasks in the first half segment 315 and two tasks in the second half segment 320, ECU-2 includes two tasks in the first half segment 315 and three tasks in the second half segment 320, and ECU-3 includes two tasks in the first half segment 315 and one task in the second half segment 320. As depicted, the exemplary communication thread 335 consists of three tasks that are made up of the one task in the second half segment 320 of ECU-3, the first of the two tasks in the second half segment 320 of ECU-1, and the second of the three tasks in the second half segment 320 of ECU-2, in that order. Since the processing of the communication and computation tasks is cyclical, in accordance with the clock cycle of the clock synchronization mechanism 190, and because the exemplary communication thread 335 consists of three functions (computations), the thread 335 acts like a pipelined process, discussed previously, in which after an initial three cycles, an output function (a steering control command for example) is produced every cycle.

While FIG. 5 depicts an exemplary thread 335 of communication 330 and computation 325 tasks, it will be appreciated that the example presented is merely one of many control commands that processing circuits 185, 186, ECU-1, ECU-2 and ECU-3, may perform, and that embodiments of the invention are not limited to only those exemplary embodiments disclosed herein.

Furthermore, while FIG. 5 depicts an exemplary thread 335 consisting of three computation tasks 325 that define its control command cycle, it will be appreciated that the invention is not so limited and that other threads that define other control commands may use any number of segments across a range of clock cycles, thereby resulting in other control command cycles having a different start-up duration. However, due to the pipelining scheme, each control command cycle will produce an output function every clock cycle following the completion of its initial cycle.

As disclosed herein, a segmented synchronous communication strategy consists of two rules for task allocation. First, data dependencies within a functional process are decoupled in a segmented communication cycle thus ensuring synchronous composition and determinism. Second, task ordering of every thread is preserved by strictly adhering to the sequential ordering of the tasks to segments. These two rules may be represented as follows:

Rule 1: If $task_i \in segment_x$, then $task_{i+1} \in segment_x$;

Rule 2: If $task_i \in segment_x$, then $task_{i+1} \in segment_y$ where $1 <= y < S$, where S is the number of segments.

That is, if task(i) is a member of segment(x), then task(i+1) is not a member of segment(x), and if there are S segments and if task(i) is a member of segment(x), then task(i+1) is a member of segment(y) where y is equal to or greater than 1 and less than S.

As disclosed, a periodic functional process consists of a number of threads, and each thread consists of a number of tasks. Tasks may be a computation operation or a communication operation, and are allocated such that synchronous composition is preserved by placing the computation and communication tasks in different segments. In the abstraction, a communication task may be viewed as being executed on a shared resource, and a computation task may be viewed as being executed on parallelized dedicated resources. Each periodic functional process may be decomposed and mapped into a distributed network time-triggered communication system such that complete cycle sequences repeat periodically at each clock cycle.

While embodiments of the invention have been disclosed illustrating a computation task followed by a communication task, it will be appreciated that the invention is not so limited, and that the invention also encompasses embodiments having a communication-computation task pair, a computation-computation task pair, or a communication-communication task pair. In any event, by applying the two rules discussed above to the periodic functional process, synchronous composition and schedule independence within a communication segment may be preserved.

As previously discussed, an embodiment of the invention may be embodied in the form of computer-implemented processes and apparatuses for practicing those processes. Alternatively, the present invention may be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to control a vehicle subsystem in response to a driver interface subsystem using a control-by-wire communication scheme that enables task scheduling and communication slot usage to be order independent.

As disclosed, some embodiments of the invention may include some of the following advantages: order independence with regard to task scheduling within a communication cycle and order independence with regard to channel slot usage, thereby enabling a greater degree of freedom for the scheduling of tasks under high volume production cycle constraints; the ability to automate task and communication scheduling by way of a programming tool; the ability to compose a large control command system using smaller control command subsystems without the need to recreate the schedule and/or re-verify its operation after integration; by enforcing a synchronous composition rule in the task cycle, some scheduling independence may still be available while maintaining consistency between the application behavior and the synchronous model behavior; the ability to simulate and formally verify the composition of the distributed communication system using existing tools without the need to re-simulate or re-verify for every small schedule change; and, a time-triggered distributed control system where the functional control threads that operate in parallel are allocated to the resources of the distributed computing environment in such a manner as to preserve the task ordering of each functional thread.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for synchronous communication in a control system for a vehicle, the product comprising:
    a non-transitory storage medium, readable by a processing circuit, storing instructions for execution by the processing circuit for:
    executing, within a first time interval, a first source task to broadcast a first destination task;
    communicating, within a second sequential time interval, the first destination task over a channel to a first destination;
    consuming, within a third sequential time interval, delivery of the first destination task;
    executing a second source task to broadcast a second destination task within the first time interval;
    communicating the second destination task over the channel to a second destination within the second sequential time interval; and
    consuming the second destination task within the third sequential time interval;
    wherein the first source task is allowed to be scheduled ahead of the second source task, and the second source task is allowed to be scheduled ahead of the first source task.

2. The product of claim 1, wherein:
each of the first, the second, and the third time intervals are a synchronous communication cycle.

3. The product of claim 1, wherein:
each of the first, the second, and the third time intervals are a sequential segment of at least one synchronous communication cycle.

4. The product of claim 3, wherein:
each synchronous communication cycle comprises at least two segments.

5. The product of claim 1, wherein:
the communicating the first destination task over a channel comprises communicating the first destination task over a first channel slot;
the communicating the second destination task over the channel comprises communicating the second destination task over a second channel slot; and
the first channel slot is allowed to be scheduled ahead of the second channel slot, and the second channel slot is allowed to be scheduled ahead of the first channel slot.

6. The product of claim 5, wherein:
the consumption of the first destination task is allowed to be scheduled ahead of the consumption of the second destination task, and the consumption of the second destination task is allowed to be scheduled ahead of the consumption of the first destination task.

7. The product of claim 6, wherein:
the storage medium further stores instructions for execution by the processing circuit for:
executing the first and second source tasks, communicating the first and second destination tasks, and consuming the first and second destination tasks, via a three-stage pipeline.

* * * * *